United States Patent [19]
Kawabata

[11] Patent Number: 5,160,160
[45] Date of Patent: Nov. 3, 1992

[54] ACTIVE SUSPENSION SYSTEM

[75] Inventor: Kazunobu Kawabata, Fujisawa, Japan

[73] Assignee: Nissan Motor Co., Ltd., Yokohama, Japan

[21] Appl. No.: 754,983

[22] Filed: Sep. 5, 1991

[30] Foreign Application Priority Data

Sep. 12, 1990 [JP] Japan .................................. 2-241455

[51] Int. Cl.$^5$ .......................................... B60G 21/00
[52] U.S. Cl. .................................. 280/707; 280/714; 188/299
[58] Field of Search ................. 280/707, 714; 188/299

[56] References Cited

U.S. PATENT DOCUMENTS

| | | | |
|---|---|---|---|
| 4,861,068 | 8/1989 | McCabe | 280/714 |
| 4,930,807 | 6/1990 | Lachaize | 280/707 |
| 4,936,423 | 6/1990 | Karnopp | 188/299 |
| 4,948,164 | 8/1990 | Hano et al. | 280/707 |

FOREIGN PATENT DOCUMENTS 1-249506 10/1989 Japan .
2-171313 7/1990 Japan .

*Primary Examiner*—Kenneth R. Rice
*Attorney, Agent, or Firm*—Lowe, Price, LeBlanc & Becker

[57] ABSTRACT

An active suspension system is disclosed in which in order to eliminate the undesired rapid lifting of the vehicle upon starting of the engine, the discharge from a fluid supply pump at such time is controlled to a level lower than that achieved when the system normally operates. In order to improve the fuel consumption of the engine, a measure is further disclosed in which the discharge from the fluid supply pump is controlled to match with that actually needed for the suspension.

12 Claims, 14 Drawing Sheets

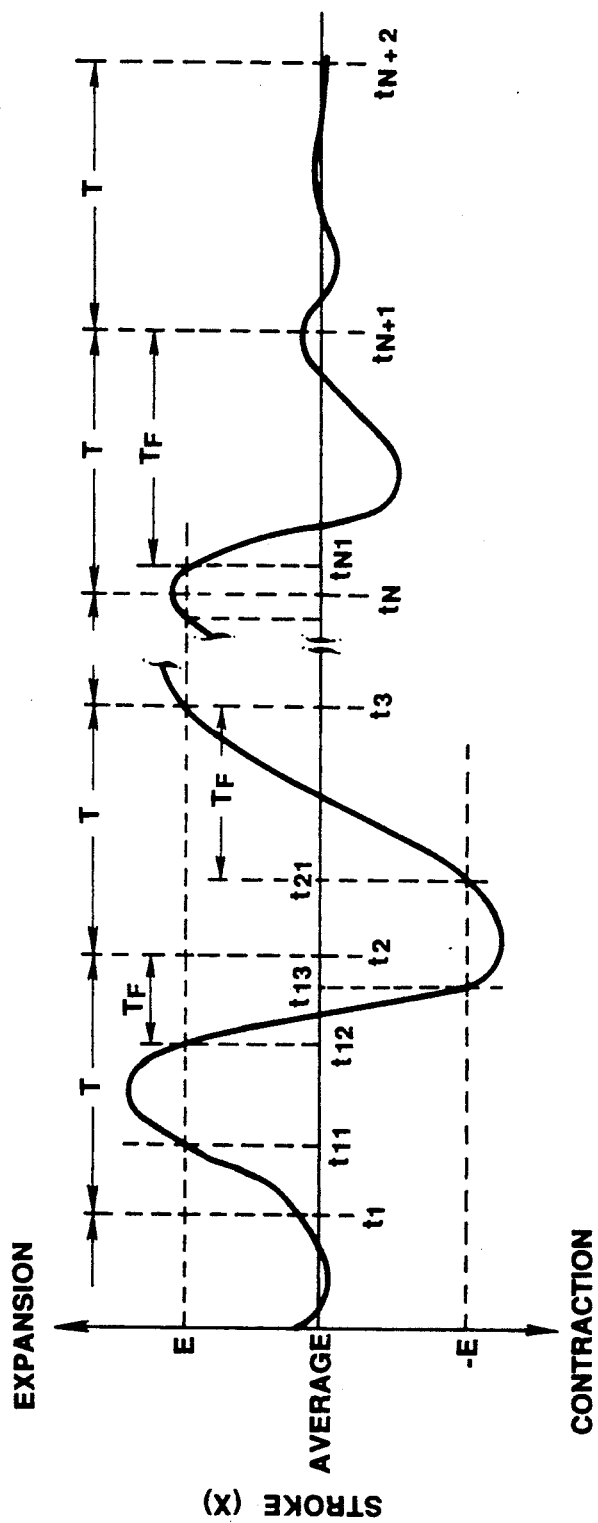

ACTIVE SUSPENSION SYSTEM

BACKGROUND OF THE INVENTION

1. Field of the Invention

The present invention relates in general to active suspension systems of a type in which a pressure holding system is provided between a fluid supply device (viz., hydraulic pump) and a pressure control valve, and more particularly, to active suspension systems of a type which is designed to control the posture change of a vehicle body at the time when the fluid supply device starts to operate.

2. Description of the Prior Art

One conventional active suspension system of the above-mentioned type is shown in Japanese Patent First Provisional Publication No. 1-249506.

In this prior art active suspension system, a fluid supply device and a pressure control valve are connected through a line pressure pipe and a drain pipe. The line pressure pipe has a line pressure check valve disposed therein, and the drain pipe has a pilot control type check valve disposed therein. The pilot control type check valve assumes its closed condition when a pilot pressure applied thereto is below a predetermined level. As the pilot pressure, a line pressure between the line pressure check valve and the pressure control valve is used.

Under operating condition wherein the fluid supply device supplies the control valve with a predetermined hydraulic pressure, the pilot control type check valve is kept fully opened and thus the return side of the pressure control valve is kept communicated with a tank of the fluid supply device through the drain pipe. However, when the fluid supply from the fluid supply device is stopped, the hydraulic pressure in a primary side of the control valve is gradually reduced, and when thereafter the hydraulic pressure becomes below the predetermined level, the pilot control type check valve is turned to assume the full close position. With this closing, the drain pipe becomes closed thereby causing the line pressure check valve and the pilot control type check valve to constitute a closed hydraulic circuit of the control valve. Due to this closed hydraulic circuit, a pressure holding condition is created and thus a rapid change of the posture of the vehicle body is suppressed.

Another prior art active suspension system is shown in Japanese Patent First Provisional Publication No. 2-171313, which has an improved responsibility with respect to the system of the Publication No. 1-249506. That is, in the system of Publication No. 2-171313, an accumulator is provided to the drain pipe of the control valve for absorbing a back pressure. That is, due to provision of such accumulator, the back pressure caused by a flow resistance in the drain pipe is absorbed, which improves the responsibility of the control valve.

However, the system of the Publication No. 2-171313 has a new drawback which is caused by provision of the accumulator.

That is, when, with the pilot control type check valve being fully closed, the hydraulic circuit including the pressure control valve forms the closed hydraulic circuit to create the pressure holding condition, the hydraulic fluid is forced to flow into the accumulator. The flowing of the fluid into the accumulator causes the hydraulic pressure in the closed hydraulic circuit to become below the predetermined level of the pilot control type check valve and thus lowers the height of the vehicle body. Furthermore, due to unavoidable fluid leakage from a hydraulic cylinder, the lowering of the vehicle body height is promoted.

When, with the vehicle body being lowered in height, the fluid supply device starts to operate and the discharge pressure of the fluid supply device exceeds the holding pressure of the closed hydraulic circuit, the hydraulic fluid is fed to the closed hydraulic circuit through the line pressure check valve. However, since, under this condition, the pilot control type check valve keeps its full closed condition, the feeding of the fluid into the closed hydraulic circuit brings about a rapid increase of the pressure in the closed circuit thereby inducing a rapid lifting of the vehicle body. This makes the passengers in the vehicle feel uncomfortable.

SUMMARY OF THE INVENTION

It is therefore an object of the present invention to provide an active suspension system which is free of the above-mentioned drawbacks.

According to one aspect of the present invention, there is provided an active suspension system of the type as mentioned hereinabove, in which the discharge from a fluid supply device at the starting time of the same is controlled to a level lower than that achieved upon completion of full opening of the pilot control type check valve.

According to another aspect of the present invention, there is provided an active suspension system which is constructed to improve the fuel consumption of the engine by matching the discharge from a fluid supply device with that actually needed for the suspension.

According to the present invention, there is provided an active suspension system for use in a motor vehicle having a vehicle body and road wheels, which system, as is conceptually shown in FIG. 1, comprises a hydraulic cylinder 100 operatively interposed between the vehicle body and each of the road wheels; a fluid supply device 101a for feeding the hydraulic cylinder 100 with an working fluid, the fluid supply device having larger and smaller discharge modes; a fluid supply line 103 extending from the fluid supply device to the hydraulic cylinder for carrying the working fluid to the hydraulic cylinder; a pressure control valve 102 operatively disposed in the fluid supply line for controlling the flow of the working fluid in the fluid supply line; a fluid return line 105 extending from the pressure control valve 102 to the fluid supply device 101a for returning the working fluid to the fluid supply device 101a; a pressure holding system 107 for holding the hydraulic pressure in the hydraulic cylinder 100, the pressure holding system including a first check valve 104 operatively disposed in the fluid supply line 103 and a second check valve 106 operatively disposed in the fluid return line 105, the second check valve being of a pilot pressure control type wherein the pressure in the fluid supply line 103 downstream of the first check valve 104 is used as a pilot pressure; a vehicle posture control means for actively controlling the posture of the vehicle by operating the pressure control valve; and a control unit 101b for controlling the fluid supply device 101a in such a manner that, upon starting of the fluid supply device 101a, said fluid supply device 101a assumes the smaller discharge mode until the second check valve 106 becomes to open and that, upon opening of the second check valve 106, the fluid supply device 101a becomes to assume the larger discharge mode.

BRIEF DESCRIPTION OF THE DRAWINGS

Other objects and advantages of the present invention will become apparent from the following description when taken in conjunction with the accompanying drawings, in which:

FIG. 15 is a graph schematically showing a change in stroke.

DETAILED DESCRIPTION OF THE INVENTION

Figure 2:
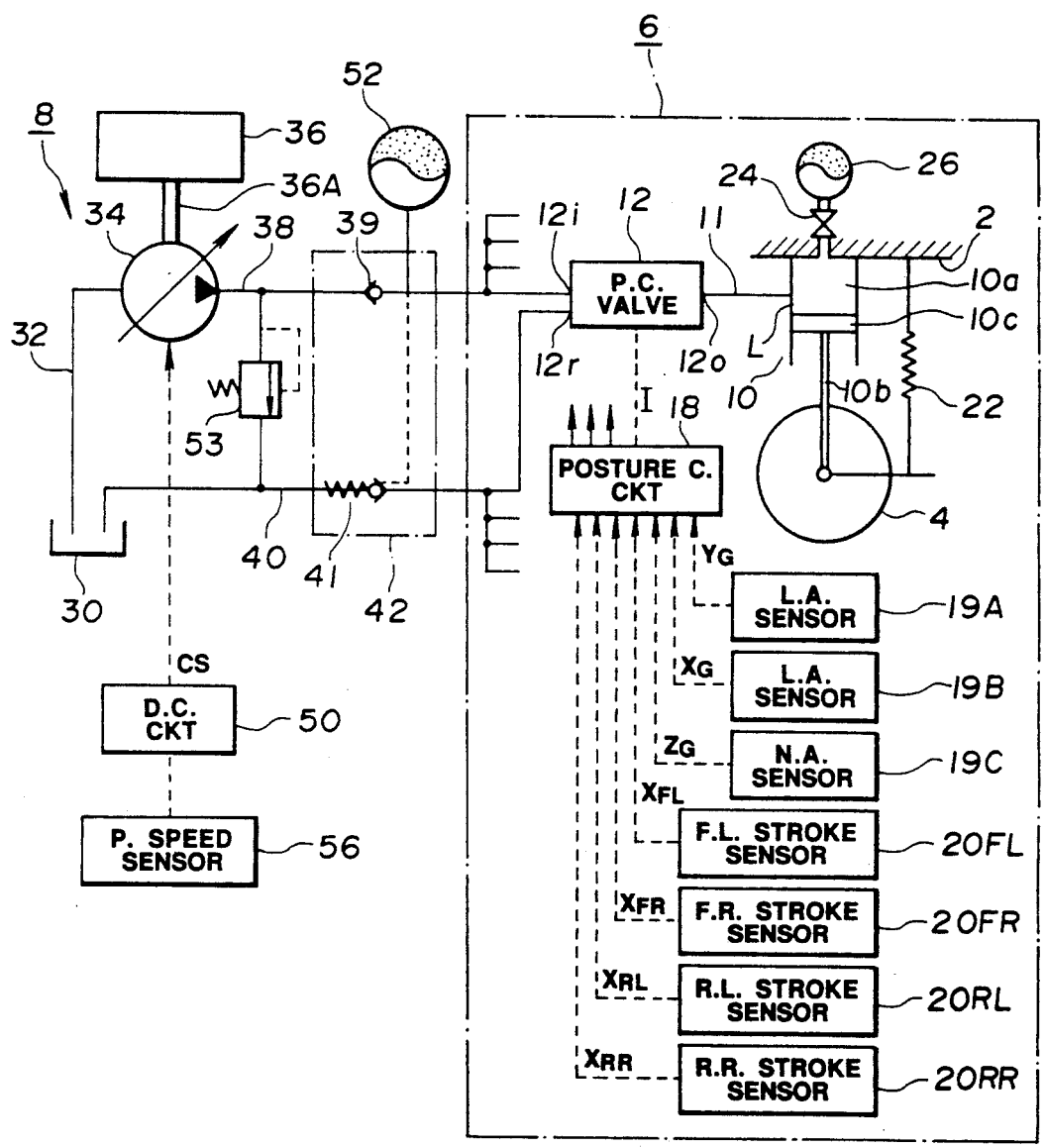
FIG. 2 is a diagrammatically illustrated view of a first embodiment of the present invention.

Referring to FIG. 2 to FIG. 8, particularly FIG. 2 of the drawings, there is shown a first embodiment of the present invention.

In the drawing, denoted by numeral 2 is a vehicle body, 4 is a road wheel, 6 is an active suspension system and 8 is a hydraulic pressure supply device or fluid supply device. Although not shown in the drawing, the four road wheels of the vehicle are respectively equipped with the same active suspension systems.

The active suspension system 6 comprises a hydraulic cylinder 10, a hydraulic pressure control valve 12, a posture control circuit 18, a lateral acceleration sensor 19A, a longitudinal acceleration sensor 19B, a normal acceleration sensor 19C and four stroke sensors 20FL, 20FR, 20RL and 20RR. Each stroke sensor senses a relative displacement between the vehicle body and a corresponding road wheel 4. For ease of description, the relative displacement will be referred to as "stroke".

The hydraulic cylinder 10 comprises a cylinder tube 10a fixed to the vehicle body 2, a piston 10c slidably disposed in the cylinder tube 10a, and a piston rod 10b extending from the piston 10c to the road wheel 4. Due to provision of the piston 10c, there is defined a hydraulic pressure chamber L in the cylinder tube 10a. The pressure chamber L is communicated through a pipe 11 to an outlet port of the hydraulic pressure control valve 12.

Denoted by numeral 22 is a coil spring for supporting the dead load of the vehicle body 2, and denoted by numerals 24 and 26 are an orifice and an accumulator which are combined to damp the vibration of a non-suspended resonance range.

Figure 3:
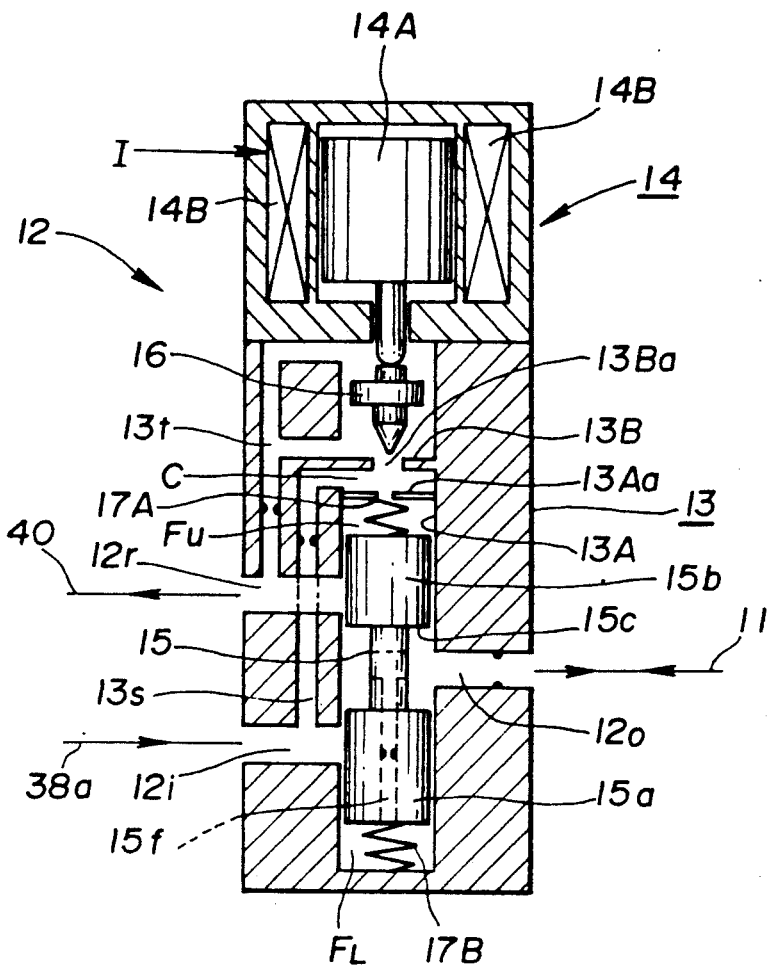
FIG. 3 is a sectional view of a control valve which is employed in the present invention.
Figure 4:
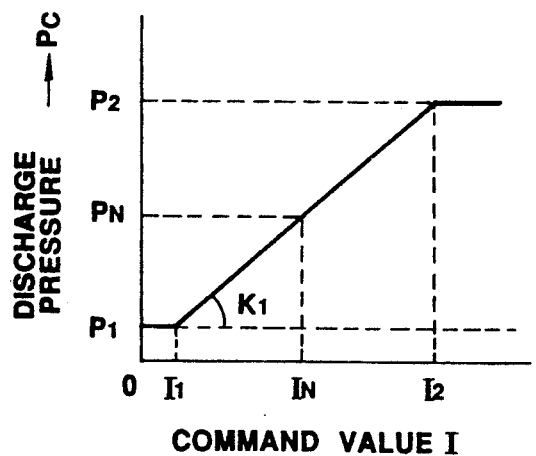
FIG. 4 is a graph showing the characteristic of the control valve.

As is shown in FIG. 3, the hydraulic pressure control valve 12 comprises a cylindrical valve housing 13 in which a valve proper is operatively installed, and a proportional solenoid 14 which is integrally mounted to the housing 13.

Within an axially extending bore 13A formed in a middle portion of the housing 13, there are slidably installed a main spool 15 and a poppet 16. Within pilot and feedback chambers Fu and FL which are defined in the bore 13A at both sides of the main spool 15, respective offset springs 17A and 17B are operatively installed. As shown, a fixed orifice 13Aa is installed in the bore 13A to define one wall of the pilot chamber Fu. The housing 13 is formed with an inlet port 12i, a return port 12r and an outlet port 12o at positions facing two lands 15a and 15b of the main spool 15 and a pressure chamber 15c in the bore 13A. The pressure chamber 15c is defined between the two lands 15a and 15b of the main spool 15. Between the poppet 16 and the feedback chamber Fu, there is installed a partition wall 13B which has a perforated valve seat 13Ba for the poppet 16. Between the the partition wall 13B and the fixed orifice 13Aa, there is defined a pressure chamber C.

The inlet port 12i is communicated with the pressure chamber C through a pilot passage 13s formed in the housing 13. The pressure chamber C is, in turn, communicated with the return port 12r through the perforated valve seat 13Ba and a drain passage 13t formed in the housing 13. The outlet port 12o is communicated with the feedback chamber FL through a feedback passage 15f.

The proportional solenoid 14 comprises an axially movable plunger 14A and an exciting coil 14B for driving the plunger 14A. When the exciting coil 14B is energized by a command value I, the plunger 14A is moved to bias the poppet 16 downward in FIG. 3. Thus, depending on the biasing force applied to the poppet 16, the discharge of the hydraulic fluid flowing though the aperture 13Ba of the partition wall 13B is controlled, that is to say, the pressure in the pressure chamber C (or the pilot chamber Fu) is controlled.

Thus, when, with the poppet 16 being biased by the proportional solenoid 14, the pressures in both chambers FL and Fu are balanced, the main spool 15 assumes the illustrated position wherein each of the input and return ports 12i and 12r is isolated from the outlet port 12o. The pressure, viz., pilot chamber in the pilot chamber Fu is adjusted by the degree of the command value I. Until the time when the pressures in both chambers FL and Fu become balanced in accordance with the pilot pressure, the main spool 15 continues a fine movement in the bore 13A. Accordingly, as is seen from the graph of FIG. 4, the output pressure Pc in the outlet port 12o can be controlled in proportion to the command value I. In the graph, reference P2 denotes the maximum line pressure produced by the fluid supply device 8.

Referring back to FIG. 2, the lateral acceleration sensor 19A, the longitudinal acceleration sensor 19B and the normal acceleration sensor 19C are mounted to the vehicle body 2 to sense accelerations of the vehicle body in lateral, longitudinal and vertical directions respectively and issue signals representative of the sensed accelerations YG, XG and ZG to the posture control circuit 18. These signals consist of positive and negative electric signals.

Each of the stroke sensors 20FL, 20FR, 20RL and 20RR comprises a potentiometer which is arranged between the vehicle body 2 and a corresponding road wheel 4 (viz., front left, front right, rear left or rear right wheel). In accordance with a relative displacement between the vehicle body 2 and the corresponding road wheel 4, the stroke sensors issue signals representative of sensed strokes XFL, XFR, XRL and XRR to the posture control circuit 18.

In the posture control circuit 18, multiplication is applied to the sensed acceleration values $Y_G$, $X_G$ and $Z_G$ to provide these values with certain gains for computing a command value for a posture change control with which the rolling, pitching and boucing of the vehicle body are controlled. Furthermore, in the control circuit 18, based on the sensed strokes $X_{FL}$, $X_{FR}$, $X_{RL}$ and $X_{RR}$, another command value for adjusting the height of the vehicle body is computed. These two command values are added to provide the afore-mentioned command value I which is applied to the hydraulic pressure control valve 12.

The fluid supply device 8 comprises a tank 30 for reserving the hydraulic fluid, a variable delivery pump 34 and a pipe 32 which extends from an inlet port of the pump 34 toward the tank 30.

The variable delivery pump 34 is a radial piston pump of rotational cylinder type driven by an output shaft 36A of an associated engine 36. That is, the pump 34 comprises generally a cylinder block formed with equally spaced radial bores, pistons slidably received in the radial bores and an eccentric ring rotatably disposed about the cylinder block. The eccentricity of the eccentric ring relative to the cylinder block is controlled by an actuator which is controlled by a given drive signal.

Figure 5:
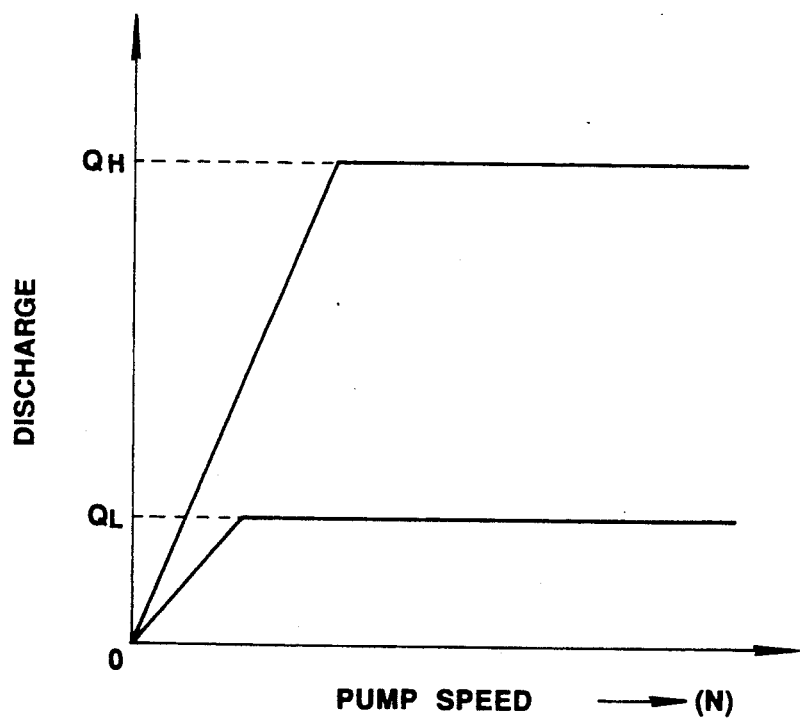
FIG. 5 is a graph showing the characteristic of a pump employed in the first embodiment.

With this, as is seen from the graph of FIG. 5, the pump 34 has two delivery modes, one being a mode in which the discharge is saturated at a lower level $Q_L$ and the other being a higher delivery mode in which the discharge is saturated at a higher level $Q_H$.

From an outlet port of the variable delivery pump 34, there extends a supply pipe 38 to the inlet port 12$i$ of the hydraulic pressure control valve 12. The pipe 38 has a check valve 39 disposed therein. From the return port 12$r$ of the control valve 12, there extends a return pipe 40 toward the tank 30 of the fluid supply device 8. This return pipe 40 has a pilot control type check valve 41 disposed therein. These two check valves 39 and 41 constitute a so-called "pressure holding system" 42.

The pilot control type check valve 41 uses, as its pilot pressure $P_P$, the line pressure in the supply pipe 38 downstream of the check valve 39. In the disclosed embodiment, when $P_P > P_N$ ($P_N$ is a neutral pressure as is seen from the graph of FIG. 4) is established, the check valve 41 assumes a check-cancelling condition wherein the valve opens thereby opening the return pipe 40, while, when $P_P \leq P_N$ is established, the check valve 41 assumes a check condition wherein the valve closes thereby closing the return pipe 40.

An accumulator 52 having a relatively larger capacity is connected to the supply pipe 38 at a position downstream of the check valve 39. A relief valve 53 is interposed between the supply pipe 38 and the return pipe 40 for setting the line pressure at a predetermined level.

The fluid supply device 8 has further a pump speed sensor 56 which senses the rotation speed of the pump 34 and issues an electric signal representative of the sensed rotation speed N. For example, as the pump speed sensor 56, a known engine speed sensor may be used, which comprises a pulse detector which electromagnetically or optically detects the speed of an input shaft of the associated transmission. The sensed rotation speed N is fed to a discharge control circuit 50.

Figure 6:
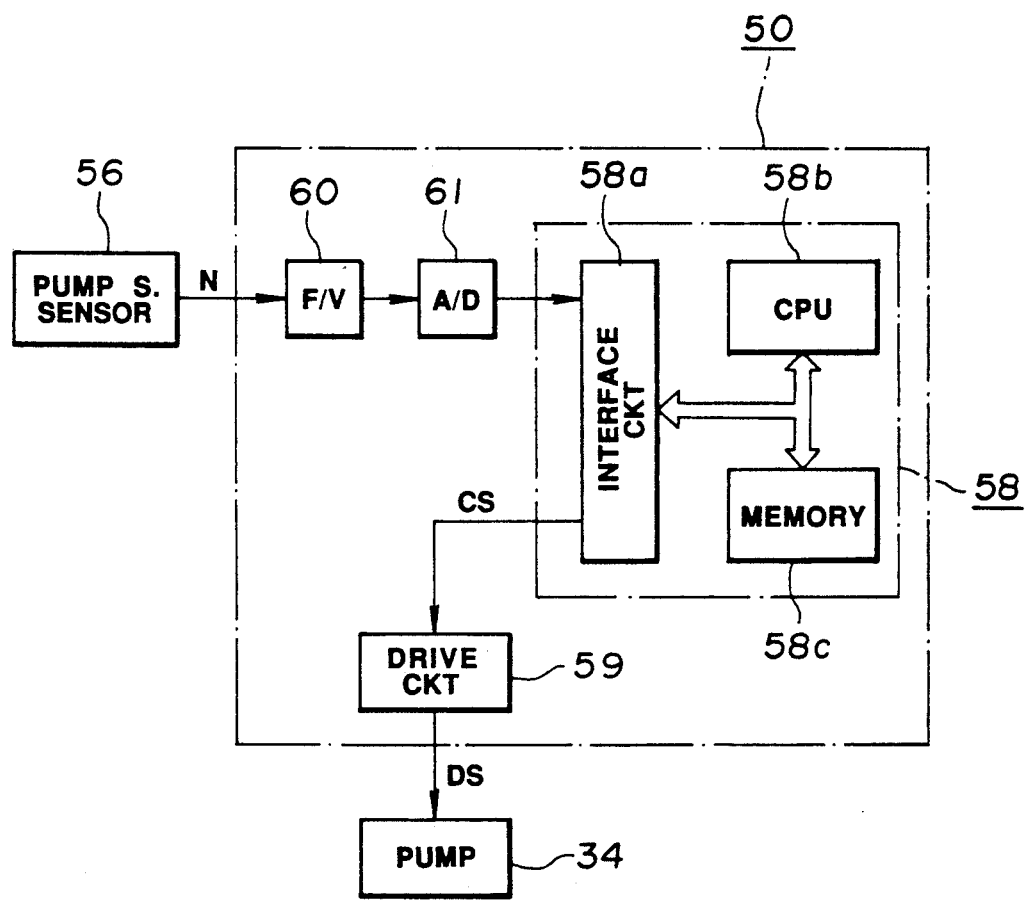
FIG. 6 is a block diagram of a discharge control circuit employed in the first embodiment.

As is shown in FIG. 6, the discharge control circuit 50 comprises generally a microcomputer 58 which has an interface circuit 58$a$, a processing unit 58$b$ and a memory unit 58$c$ installed therein, and a drive circuit 59 to which a control signal CS is fed from the interface circuit 58$a$. A drive signal DS issued from the drive circuit 59 is fed to the actuator of the variable delivery pump 34. When the drive signal DS is of a lower level, the pump 34 assumes the mode $Q_L$, while, when the drive signal DS is of a higher level, the pump 34 assumes the higher delivery mode $Q_H$, as is understood from the graph of FIG. 5.

The rotation speed N sensed by the pump speed sensor 56 is fed to an input side of the interface circuit 58$a$ through a F/V (frequency/voltage) convertor 60 and an A/D (analog/digital) converter 61, and the control signal CS for controlling the discharge of the variable delivery pump 34 is outputted from an output side of the interface circuit 58$a$. At the processing unit 58$b$, the starting time of the pump 34 is derived from the sensed rotation speed N. During a predetermined period $T_S$ from the starting time to a time within which the pilot control type check valve 41 can become its open condition, a control signal CS of for example logical value "0" for causing the variable delivery pump 34 to assume the mode is fed through the interface circuit 58$a$ to the drive circuit 59. When the period $T_S$ elapses, a control signal CS of for example logical value "1" for causing the pump 34 to output a discharge by a amount which is sufficient for the use of the active suspension system 6 is fed through the interface circuit 58$a$ to the drive circuit 59. A program needed for the processing at the processing unit 58$b$ is memorized in the memory unit 58$c$ and the updated data needed for the data processing are memorized successively in the memory unit 58$c$.

In the following, operation of the first embodiment will be described with reference to the flowchart of FIG. 7 which shows the process carried out in the processing unit 58$b$ of the microcomputer 58.

The process shown in this flowchart starts when an ignition key cylinder is turned to a position to turn an accessary switch ON and the process is carried out every predetermined periods for example 20 msec as timer-interruption process.

That is, at step (1), the sensed rotation speed N in digital form outputted from the D/A converter 61 is read, and at step (2), a judgement is carried out as to whether the value N is greater than a threshold value $N_T$ or not for sensing the starting condition of the pump 34. If No, that is, when $N < N_T$ is established, it is judged that the pump 34 is at a standstill, and the operation flow goes to step (3) where the variable $f_{i-1}$ is determined "0". Then, the operation flow goes to step (4) where the control signal CS is determined to the logical value "0" finishing the timer-interruption process, and then the operation flow goes back to a predetermined main program. While, when, at step (2), $N \geq N_T$ is established, the operation flow goes to step (5) where a judgement is carried out as to whether the variable $f_{i-1}$ is "0" or not, that is, whether the starting of the variable delivery pump 34 is caused by the starting of the engine 36 or not. When, the variable $f_{i-1}$ is "0", it is judged that the pump 34 begins to operate, and then the operation flow goes to step (6).

At step (6), a predetermined time $T_S$ sufficient for permitting the pilot control type check valve 41 to assume its open condition is set by a timer, and then, the operation flow goes to step (7). At this step, a flag "1" is raised which means that the pump 34 is at the starting condition. Then, the operation flow goes to step (8) where the variable $f_{i-1}$ is set to "1" and then the operation flow goes to step (4).

When, at step (5), $f_{i-1}=1$ is established, the operation flow goes to step (9) where a judgement is carried out as to whether the flag F is set at "1" or not. If Yes, the operation goes to step (10) where a judgement is carried out as to wheter the predetermined time $T_S$ elapses or not. If Yes, at step (10), that is, when the time $T_S$ has elapsed, the operation flow goes to step (11) where the control signal CS is determined to the logical value "1", and then the operation signal goes to step (12) where the flag F is reset to "0" finishing the timer-interruption process and then the operation flow goes back to the predetermined main program.

When, at step (9), F=0 is established, or when at step (10), a judgement is so made that the predetermined time $T_S$ has not elapsed, the timer-interruption process is instantly finished and the operation flow goes back to the main program.

Figure 1:
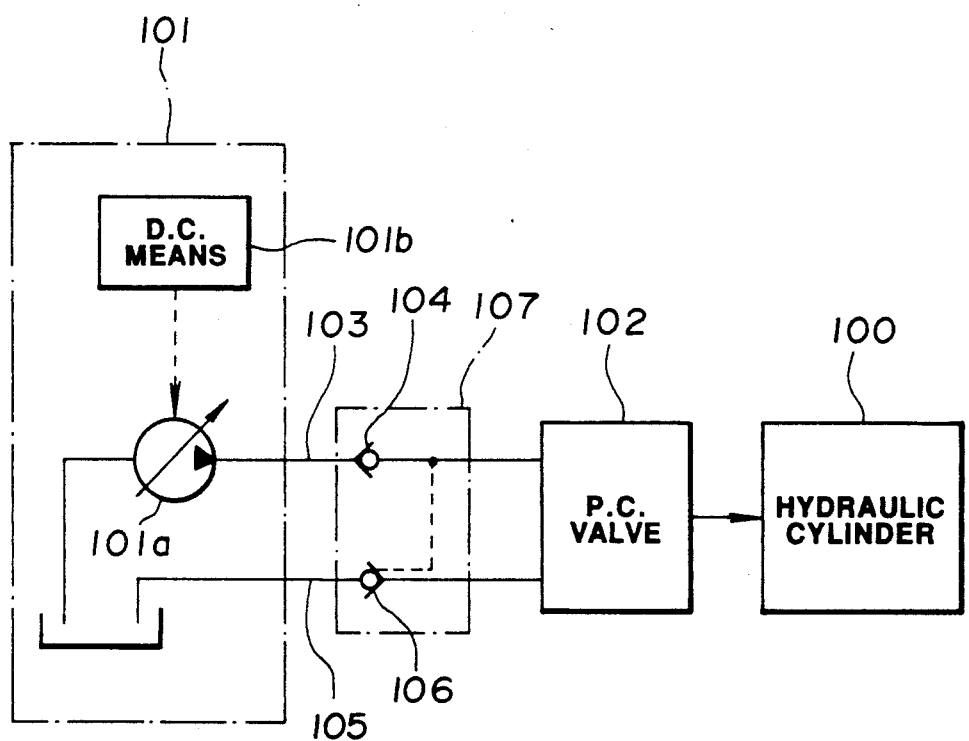
FIG. 1 is a schematic view showing the outline of the present invention.
Figure 7:
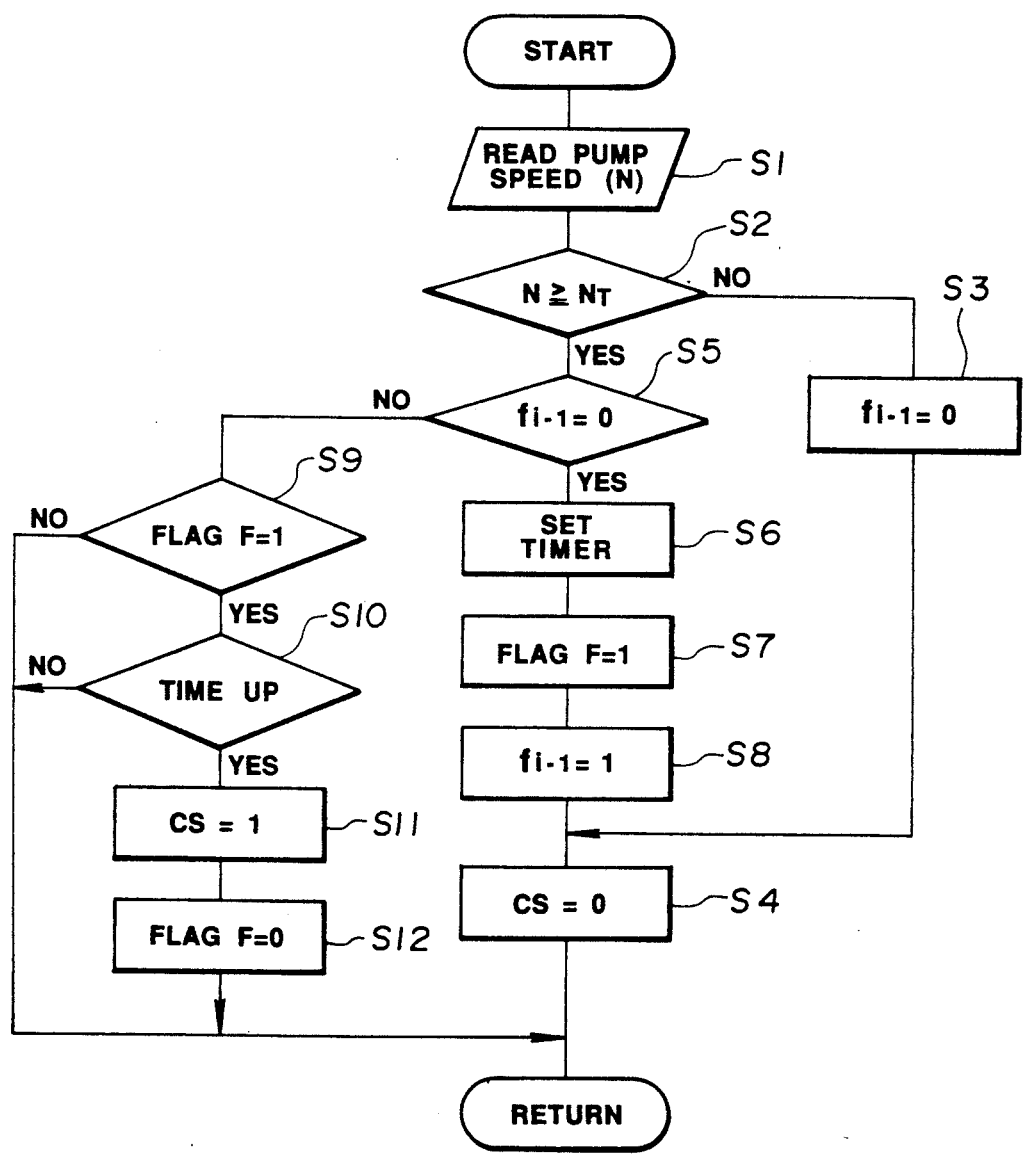
FIG. 7 is a flowchart showing operation steps for achieving the discharge control of the first embodiment.

The timer-interruption process of FIG. 7 is carried out by a discharge control means 101b shown in the outlined view of FIG. 1.

Figure 8:
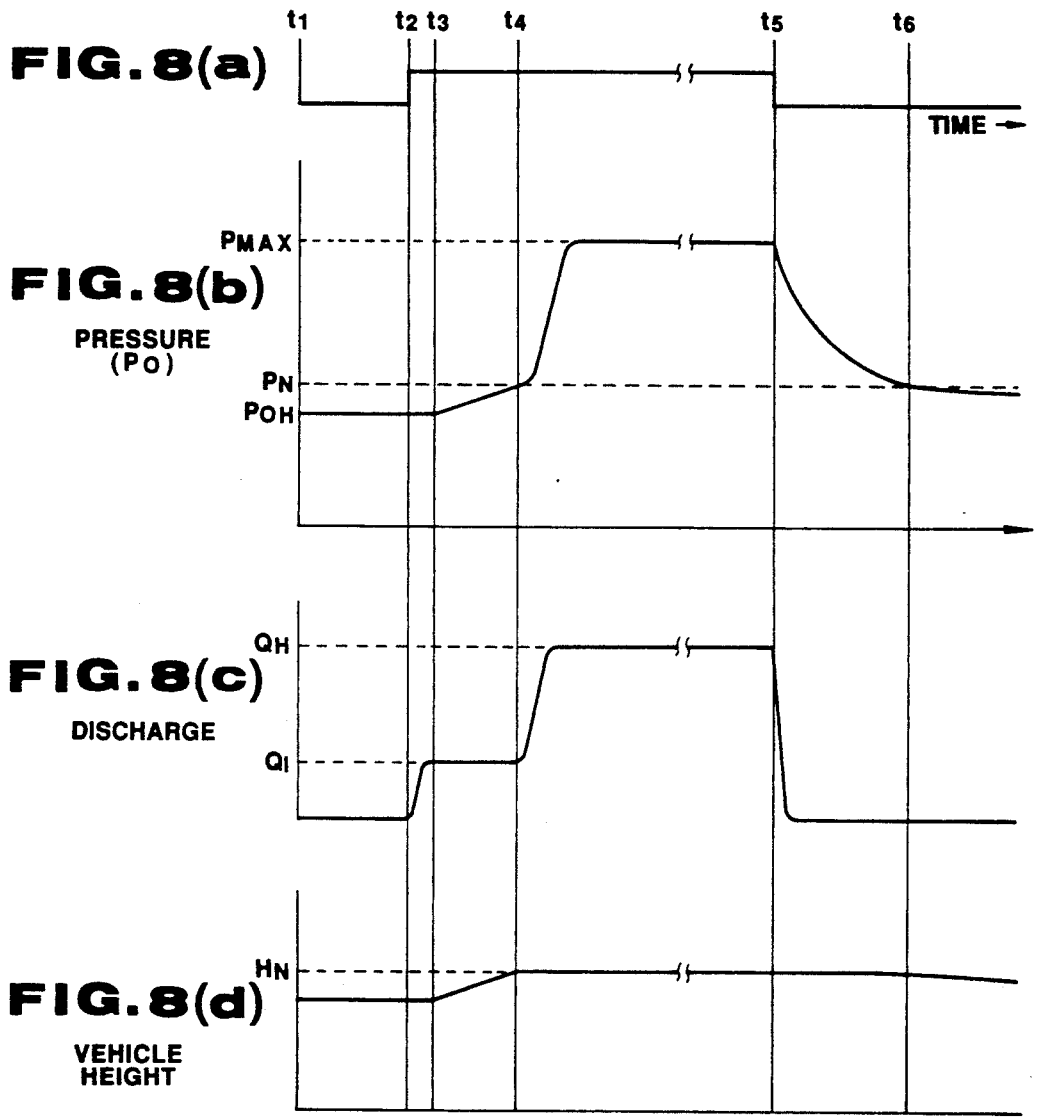
FIGS. 8(a)-(d) are a time chart used for describing the operation of the first embodiment.

When the accessary switch actuated by the ignition key cylinder is under OFF condition (and thus, the engine 36 is at a standstill), and when the pilot control type check valve 41 assumes its full closed condition producing a closed circuit of a hydraulic pressure control system which includes the hydraulic pressure control valve 12 and thus producing a pressure holding condition, the pressure Po in the supply pipe 38 between the check valve 39 and the pressure control valve 12 is lower than the predetermined value $P_p$ of the pilot control type check valve 41, as is seen from the graph of FIG. 8.

When, now, that is, at the time of $t_1$, the accessary switch is turned ON, the timer-interruption process of FIG. 7 starts. However, as is seen from FIG. 8(a), because, in this condition, the engine 36 is still at a standstill and thus the variable delivery pump 34 is still at a standstill, the pump speed signal N is not issued from the pump sensor 56 and thus the output voltage of the of the F/V converter 60 is zero. Accordingly, due to the relation of $N<N_T$, the operation flow (see FIG. 7) goes from step (2) to step (3) where the variable $f_{i-1}$ is determined to "0" and then the operation flow goes to step (4). At this step, the control signal CS of logical value "0" is outputted to the drive circuit 59 (see FIG. 6). Thus, from the drive circuit 59, the drive signal DS of lower level is outputted to the variable delivery pump 34 for the purpose of keeping the pump 34 at the mode $Q_L$. However, in practice, the delivery of the pump 34 is zero because the pump 34 is at a standstill.

When, thereafter, that is, at the time of $t_2$, the engine 36 starts to operate causing starting of the pump 34, the discharge of the pump 34 shows the characteristic of FIG. 8c wherein the discharge is increased to a lower value $Q_L$ and thereafter kept at the lower value $Q_L$.

Because of keeping the smaller discharge value $Q_L$ of the pump 34, the discharge pressure is gradually increased. When, at the time of $t_3$, the discharge pressure thus exceeds the holding pressure $P_{OH}$ in the supply pipe 38 between the hydraulic pressure control valve 12 and the check valve 39, the pressure $P_O$ is gradually increased through the check valve 39. In accordance with this, the vehicular height is gradually increased as is seen from FIG. 8(d).

When, thereafter, that is, at the time of $t_4$, the pressure $P_O$ reaches the predetermined value $P_N$ of the pilot control type check valve 41, the check valve 41 is turned to assume its full open condition and thus the pressure holding condition becomes cancelled. Thus, the return port 12r of the pressure control valve 12 becomes communicated with the tank 30 of the fluid supply device 8 through the return pipe 40. In response to this, the control of the pressure control valve 12 is carried out in accordance with a command current I issued from the posture control circuit 18.

At the time of $t_4$, or at a time somewhat delayed from the time $t_4$, the predetermined time $T_S$ of the timer elapses. Upon this, the operation flow (see FIG. 7) goes from step (10) to step (11) where the control signal CS of logical value "1" is inputted to the drive circuit 59. Accordingly, from the drive circuit 59, the drive signal DS of higher level is outputted to the variable delivery pump 34. With this, the discharge of the pump 34 is increased to the higher delivery value $Q_H$, as is seen from FIG. 8(c). When the discharge of the pump 34 becomes to the higher delivery value $Q_H$, the pressure $P_O$ in the supply pipe 38 between the pressure control valve 12 and the check valve 39 is rapidly increased to a level sufficient for normally operating the active suspension system 6, as is seen from FIG. 8(b).

During this, in the posture control circuit 18, based on the signals representative of the strokes $X_{FL}$, $X_{FR}$, $X_{RL}$ and $X_{RR}$ sensed by the stroke sensors 20FL, 20FR, 20RL and 20RR, a process for adjusting the posture of the vehicle is carried out in which a command current I for keeping the vehicle at a desired posture against the change of the posture is inputted to the pressure control valve 12. Accordingly, the vehicle can be kept in the desired posture without being subjected to a rapid posture change caused by a rapid increase of the pressure $P_0$ between the pressure control valve 12 and the check valve 39.

When now the vehicle starts to move, the posture control circuit 18 controls the rolling, pitching and boucing of the vehicle body in accordance with the accelerations sensed by the lateral acceleration sensor 19A, the longitudinal acceleration sensor 19B and the normal acceleration sensor 19C, so that the vehicle body is kept generally flat during its movement. Furthermore, during this, the posture control circuit 18 carries out a gentle posture control for the vehicle body based on the signals representative of the strokes $X_{FL}$, $X_{FR}$, $X_{RL}$ and $X_{RR}$.

When, at the time of $t_5$ after stopping the vehicle, the engine 36 is stopped, the discharge of the pump 34 is rapidly decreased to zero. However, due to the work of the check valve 39, the back flow of the fluid from the pressure control valve 12 and the accumulator 52 is suppressed, and thus, rapid reduction of the pressure $P_0$ between the pressure control valve 12 and the check valve 39 does not occur. That is, after stopping of the engine 36, the pressure $P_0$ is gradually reduced in accordance with the fluid amount used in response to the control of the posture control circuit 18 continued after the engine stopping. When, at the time $t_6$, the pressure $P_0$ is reduced to a level lower than the predetermined value $P_N$ of the pilot control type check valve 41, the pilot control type check valve 41 is turned to assume the full closed condition, and thus, the hydraulic pressure control system including the pressure control valve 12 produces a closed circuit thereof. Thus, a pressure holding condition is created.

Thereafter, due to escape of fluid from the hydraulic cylinder 10, the pressure in the closed circuit is gradually decreased and thus the vehicle height is gradually lowered.

As will be understood from the above description, in the first embodiment, at the time when, due to starting of the engine, the variable delivery pump 34 is started, the discharge of the pump 34 is kept controlled to the lower value $Q_L$ which is lower than the higher value $Q_H$ made when the pilot control type check valve 41 assumes its open position.

Accordingly, in a case wherein the vehicle takes a height lower than a desired height, the increase of the vehicle height is gradually or gently carried out until the time when the posture control by the active suspension system 6 is available, that is, until the time when the pilot control type check valve 41 is turned to assume the open condition. The passengers in the vehicle can enjoy the gentle rising of the vehicle.

Figure 9:
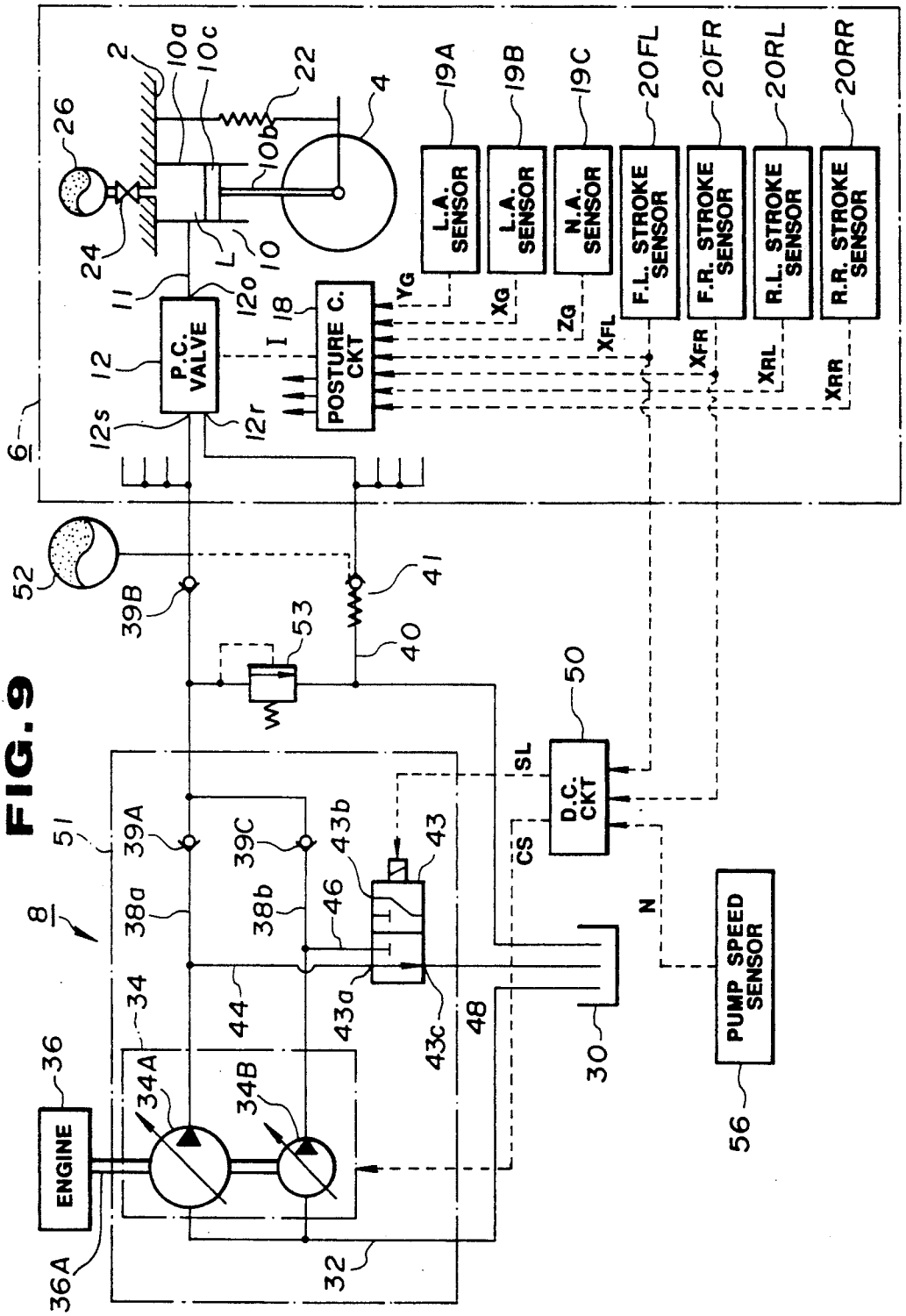
FIG. 9 is a view similar to FIG. 2, but showing a second embodiment of the present invention.

Referring to FIGS. 9 to 15, particularly FIG. 9, there is shown a second embodiment of the present invention. Parts substantially the same as those of the above-mentioned first embodiment are denoted by the same numerals, and detailed description of them will be omitted from the following.

As will become understood as the description proceeds, in the active suspension system of this second embodiment, a measure is provided for improving a fuel economy of the vehicle. That is, during cruising of a vehicle, the discharge of the fluid supply device 8 is controlled in accordance with the amount of fluid operatively used in the active suspension system.

As is shown in FIG. 9, the fluid supply device 8 has a variable delivery pump unit 34 driven by an output shaft 36A of the engine 36, which includes a larger discharge variable delivery pump 34A and a smaller discharge variable delivery pump 34B. The pump unit 34 comprises generally a cylinder block formed with first and second groups of equally spaced radial bores, first and second groups of pistons slidably received in the radial bores and an eccentric ring rotatably disposed about the cylinder block. The parts of the first and second groups constitute the larger and smaller discharge variable delivery pumps 34A and 34B, respectively.

Figure 14:
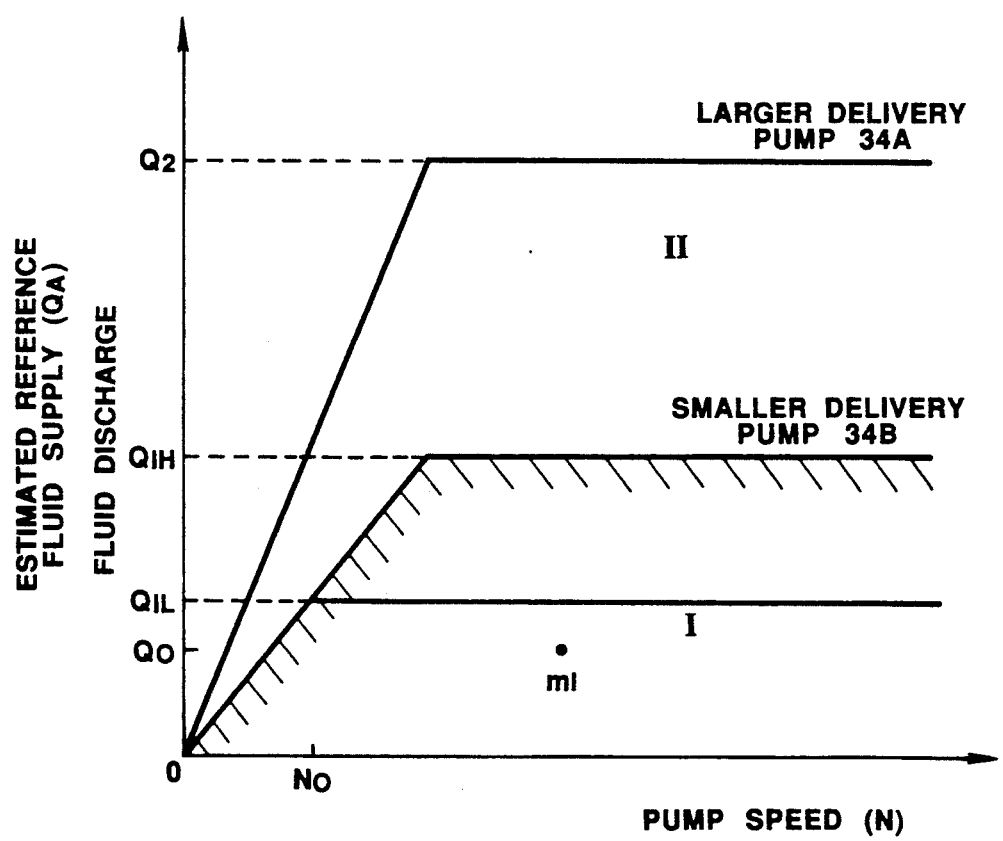
FIG. 14 is a graph showing the characteristic of a pump employed in the second embodiment.

The characteristics of these pumps 34A and 34B are shown in the graph of FIG. 14. As is seen from this graph, at the starting time of the engine wherein a smaller discharge of the pump unit 34 is needed, a smaller discharge $Q_{1L}$ of the smaller discharge pump 34B is used, and when, after the time when the pilot control type check valve 41 is turned to assume the open condition, a larger amount of fluid is needed, the discharge $Q_2$ of the larger discharge pump 34A is used, and under cruising or stopping of the vehicle wherein only a small discharge of fluid is needed, a larger discharge $Q_{1H}$ of the smaller discharge pump 34B is used. It is to be noted that by changing the eccentricity of the eccentric ring relative to the cylinder block, the discharge of each pump 34A or 34B is changed.

Referring back to FIG. 9, from an outlet port of the higher delivery pump 34A, there extends a first supply pipe 38a to an inlet port 12i of the pressure control valve 12. The first supply pipe 38a has two check valves 39A and 39B disposed therein. From an outlet port of the lower delivery pump 34B, there extends a second supply pipe 38b to the first supply pipe 38a between the two check valves 39A and 39B. The second supply pipe 38b has a check valve 39C disposed therein.

As is shown, the fluid supply device 8 further comprises an electromagnetic switching valve 43 of spring offset type. The valve 43 has three ports and two operating positions. That is, a first inlet port 43a of the valve 43 is connected through a pipe 44 to the first supply pipe 38a between an outlet port of the higher delivery pump 34A and the check valve 39A, and a second inlet port 43b is connected through a pipe 46 to the second supply pipe 38B between an outlet port of the lower delivery pump 34B and the check valve 39C. An outlet port 43c of the valve 43 is connected through a pipe 48 to the tank 30.

The valve 43 can selectively assume the two operating positions in accordance with ON-OFF commands of a switching signal SL applied thereto from the discharge control circuit 50. That is, when an OFF command is represented by the switching signal SL, the valve 43 assumes a so-called "small flow position" wherein, as is shown in FIG. 9, the first inlet port 43a and the outlet port 43c are communicated and the second inlet port 43b is closed, and when an ON command is represented by the signal SL, the valve 43 assumes a so-called "large flow position" wherein the second inlet port 43b and the outlet port 43c are communicated and the first inlet port 43a is closed.

The higher delivery pump 34A, the lower delivery pump 34B, the check valves 39A and 39C and the electromagnetic switching valve 43 constitute a variable delivery pump section 51 which corresponds to a variable delivery pump means 101a shown in the outlined view of FIG. 1.

Referring back to FIG. 9, the pump rotation speed representing signal N from the pump speed sensor 56 and the stroke representing signals $X_{FL}$ and $X_{FR}$ from the stroke sensors 20FL and 20FR are inputted to the discharge control circuit 50 for controlling the pump unit 34 and the valve 43.

Figure 10:
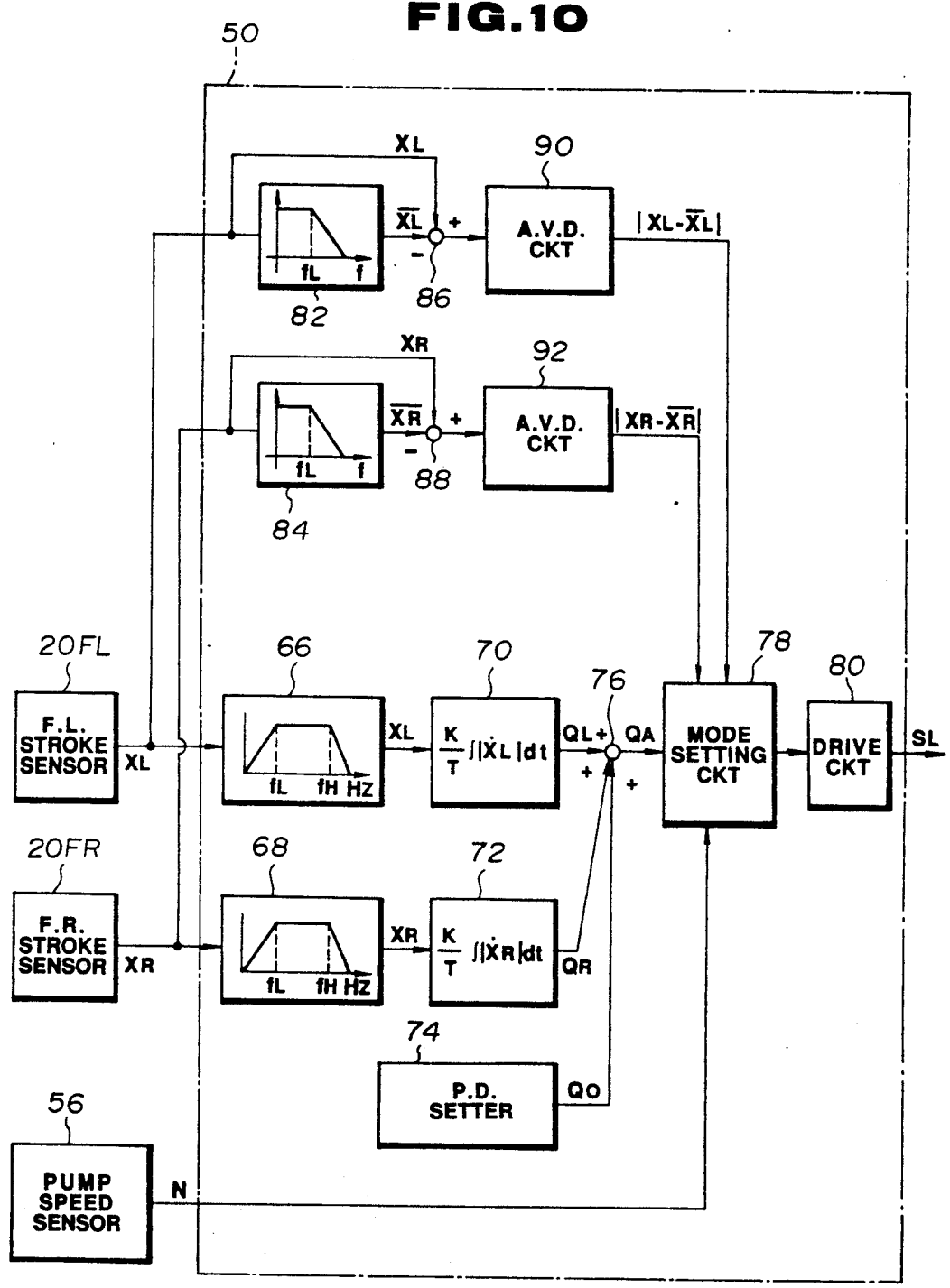
FIG. 10 is a block diagram of a discharge control circuit employed in the second embodiment.

As is shown in FIG. 10, the discharge control circuit 50 comprises bandpass filters 66 and 68 which filter the signals $X_{FL}$ and $X_{FR}$ applied thereto, integrators 70 and 72 which integrate the filtered signals from the filters 66 and 68 in an after-mentioned manner, a pilot discharge setter 74, an adding means 76 which adds treated signals $Q_L$ and $Q_R$ from the integrators 70 and 72 and a signal $Q_O$ from the pilot discharge setter 74, a mode setting circuit 78 which, by receiving a signal $Q_A$ from the adding means 76 and the pump speed representing signal N, sets the delivery mode of the pump unit 34, and a drive circuit 80 which, by receiving a signal from the mode setting circuit 78, issues the switching signal SL which is fed to the switching valve 43. It is to be noted that the signal $Q_A$ corresponds to an estimated reference supply of fluid.

In each bandpass filter 66 or 68, the cut-off frequency of lower frequency side is set to a value (for example, 0,5 Hz) which can block the signal representing a stroke change produced during the adjustment of the vehicle height, and the cut-off frequency of higher frequency side is set to a value (for example, 6 Hz) which can block the signal representing a stroke change produced by a vibration of non-suspended resonance range.

In each integrator 70 or 72, integration of the stroke changes is calculated by using the following equation:

$$Q = \frac{K}{T} \int |\dot{x}| dt \qquad (1)$$

That is, the amount of fluid fed into or discharged from the hydraulic cylinder 10, which corresponds to the total stroke ($1/T \cdot \int |\dot{x}| dt$) integrated within an integral time T (for example, two seconds), is derived. "K" is a gain based on the pressure receiving area of the hydraulic cylinder 10.

Now, our attention will be paid to actual stroke changes which take place between the vehicle body 2 and the road wheels 4. Usually, such stroke changes cause formation of such vibration that an expansion side and a contraction side appear symmetrically. However, the time when a sufficient discharge from the pump unit 34 is actually needed is only the time when, due to occurrence of expansion stroke, the fluid is fed to the hydraulic cylinder 10. That is, in a case wherein, due to occurrence of contraction stroke, the fluid is discharged from the cylinder 10, there is no need of feeding fluid to the cylinder 10. However, since the amount of fluid prepared at such contraction stroke may be used for operating the hydraulic cylinders 10 of rear road wheels 4, the equation of (1) represents but in brief the amount of fluid used for the stroke changes of four road wheels.

The pilot discharge setter 74 outputs a signal $Q_O$ representative of an internal leakage of the hydraulic cylinders 12 of the four road wheels. Thus, the signal $Q_A$ from the adding means 76 represents the estimated amount of fluid used in the entire of the system.

As is seen from FIG. 10, the discharge control circuit 50 comprises lowpass filters 82 and 84 which constitute a first calculating part, adding means 86 and 88 and absolute value deriving circuits 90 and 92. Each lowpass filter 82 or 84 derives an average of stroke $\overline{X}_L$ or $\overline{X}_R$ of the signal $X_L$ or $X_R$ fed thereto from the stroke sensor 20FL and 20FR. Each adding means 86 or 88 carries out the calculatin of $(X_L - \overline{X}_L)$ or $(X_R - \overline{X}_R)$. Each absolute value deriving circuit 90 or 92 derives the absolute value of the $(X_L - \overline{X}_L)$ or $(X_R - \overline{X}_R)$ and outputs a signal representative of the absolute value to the mode setting circuit 78.

For smoothing the signal $X_L$ or $X_R$, the cut-off frequency of each lowpass filter 82 or 84 is set to a value (for example, 0.1 Hz) which is smaller than a stroke frequency range (for example, 1 to 10 Hz) between a suspended resonance vibration range and a non-suspended vibration range. The adding means 86 and 88 and the absolute value deriving circuits 90 and 92 constitute a second calculation part.

Figure 11:
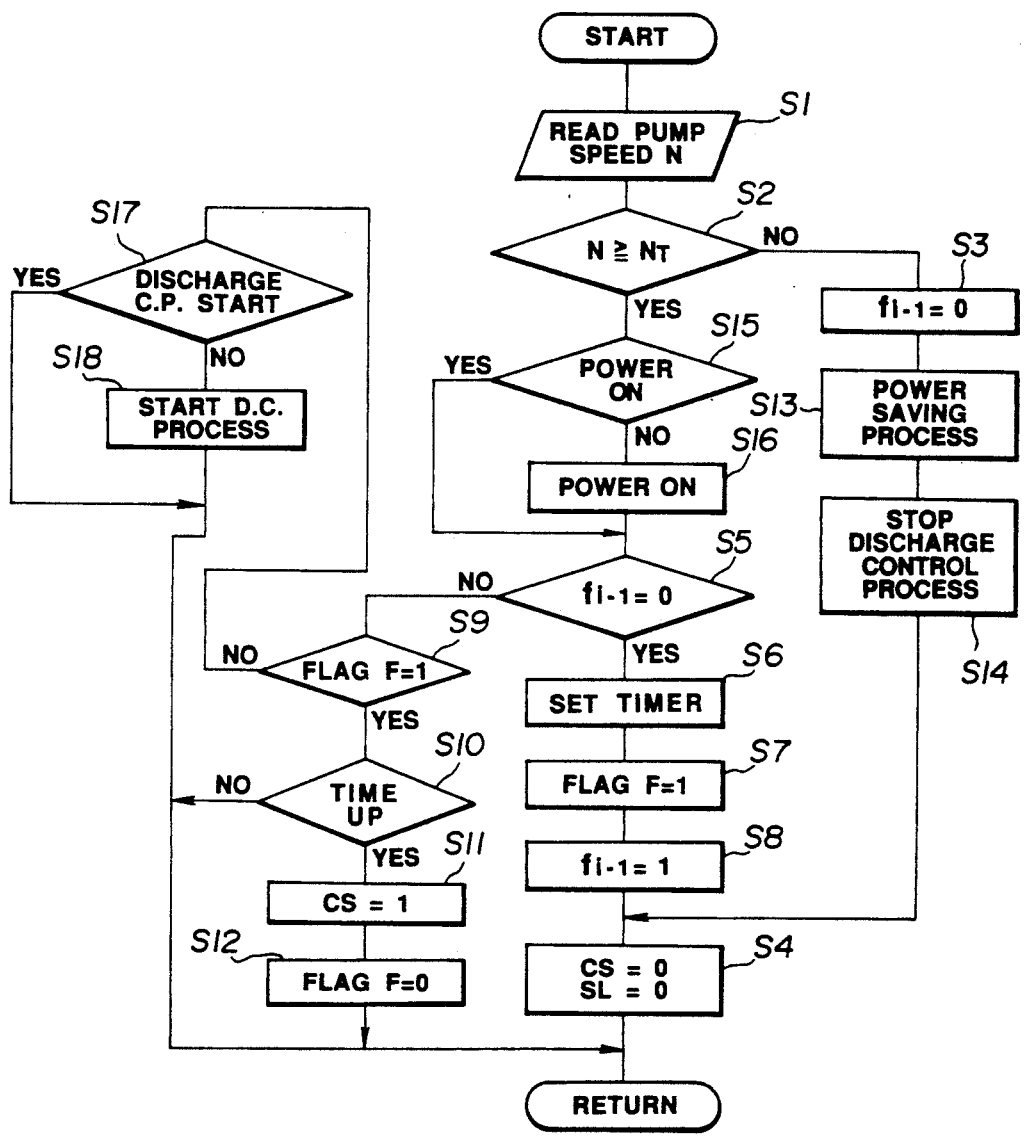
FIGS. 11, 12 and 13 are flowcharts showing operation steps carried out in respective mode setting circuits which are employable in the second embodiment.
Figure 12:
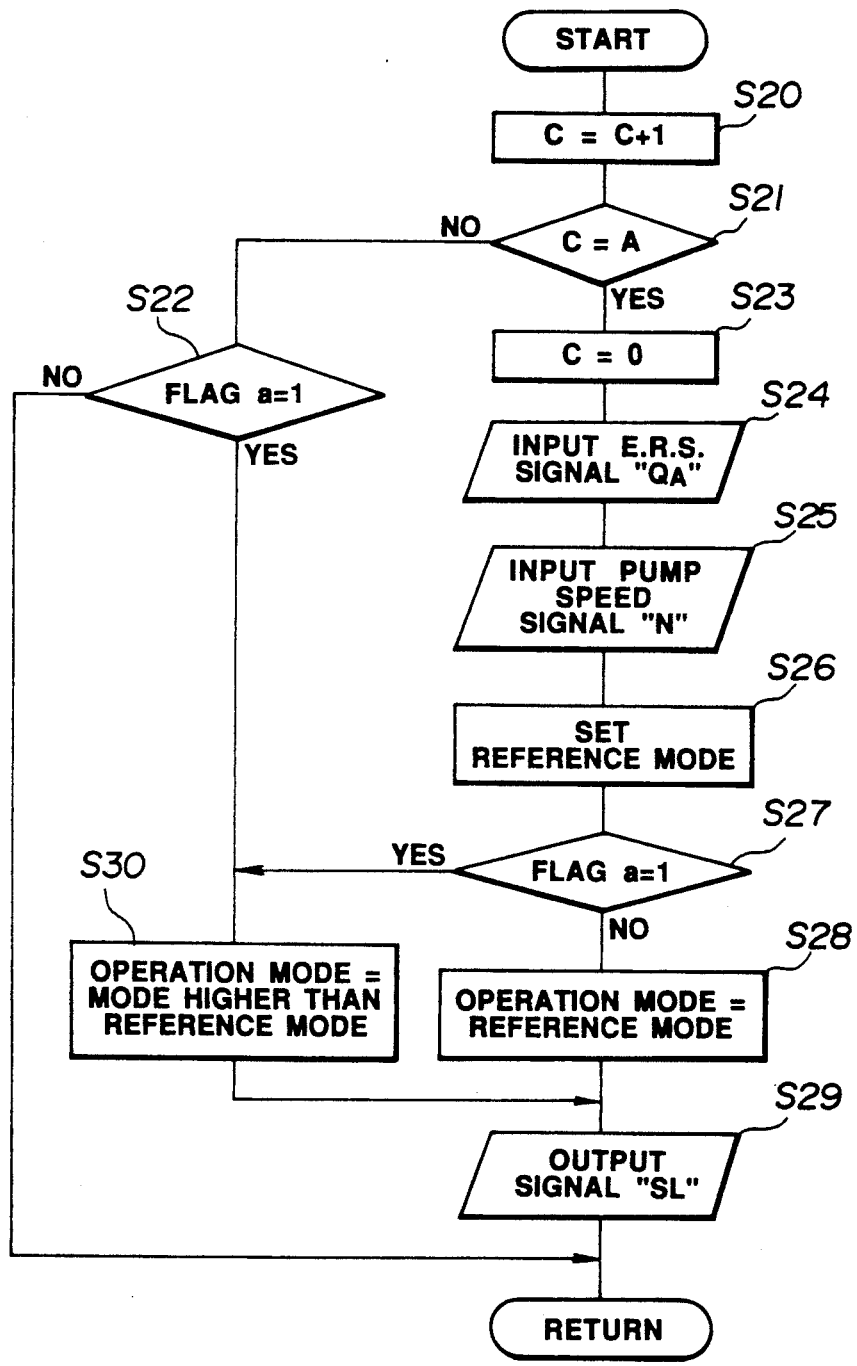
Figure 13:
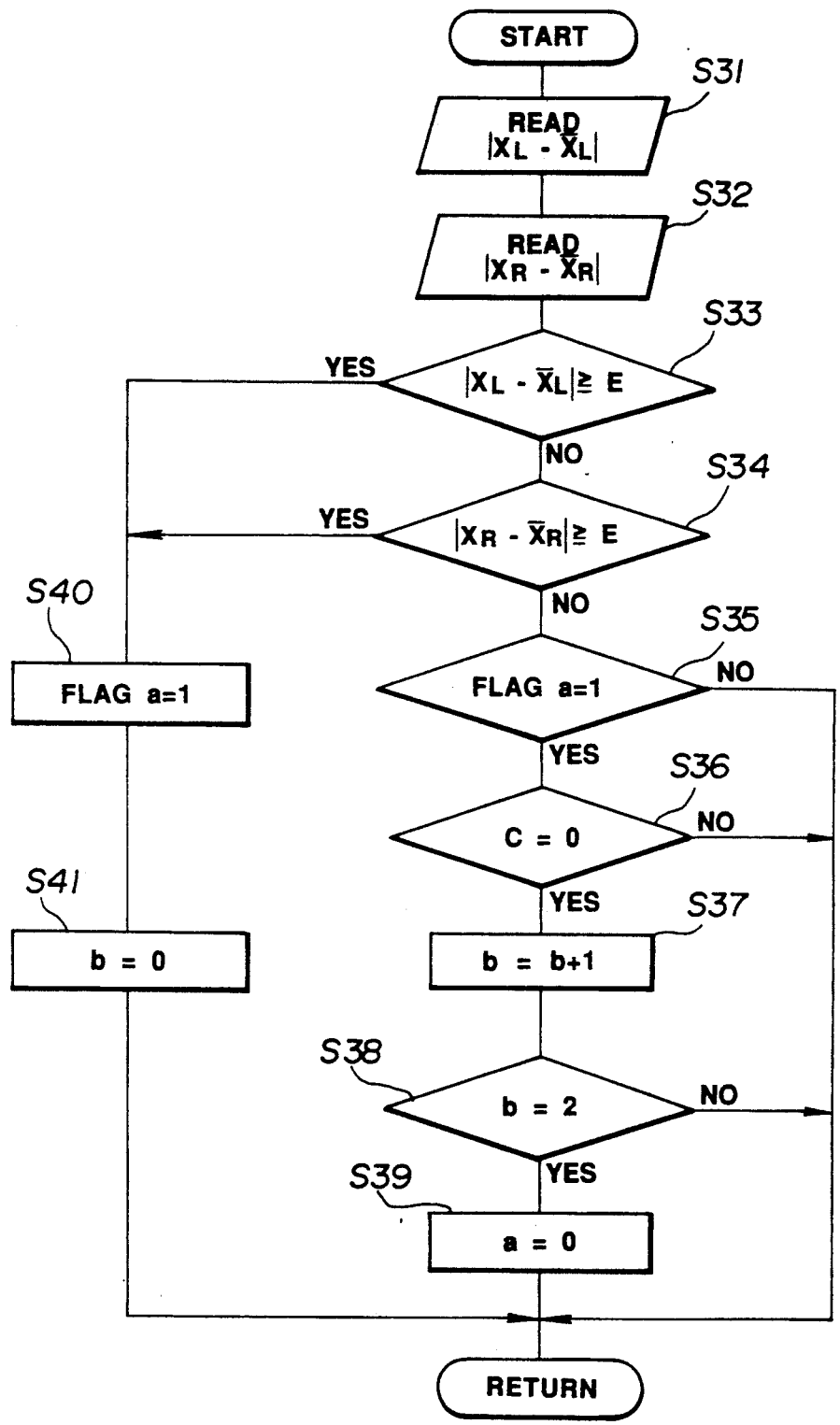

The mode setting circuit 78 includes a microcomputer in which a mode map depicting the discharge characteristic shown in the graph of FIG. 14 is memorized and in which a process shown by the flowcharts of FIGS. 11 to 12 is carried out at intervals of time $\Delta t$ ($<T$). The process depicted by the flowchart of FIG. 11 is similar to that of FIG. 7. The process of FIG. 12 is used for selecting the delivery modes I and II at intervals of the time T which synchronizes with the cycle of the above-mentioned integration, and issues a control signal of logical value "0" when the mode I wherein the lower delivery pump 34B is connected to the fluid supply line is selected and issues a control signal of logical value "1" when the other mode II wherein the higher delivery pump 34A is connected to the fluid supply line is established. The process of FIG. 13 is used to check the degree of the stroke at intervals of time $\Delta t$.

When the mode I is selected, the drive circuit 80 issues a switching signal of OFF command and when the other mode II is selected, the circuit 80 issues a switching signal of ON command.

In the discharge control circuit 50, the bandpass filters 66 and 68, the integrators 70 and 72, the pilot discharge setter 74 and the adding means 76 constitute a means which estimates the amount of fluid operatively used in the active suspension system 6.

In the following, operation of the second embodiment will be described with reference to the flowcharts of FIGS. 11 to 13.

First, the operation of the mode setting circuit 78 will be described with reference to the flowchart of FIG. 11. In this circuit 78, there is carried out a process for controlling the discharge at intervals of a given time $\Delta t$ (for example, 20 msec.), which is similar to the process shown in FIG. 7. Thus, description of steps substantially the same as those of the process of FIG. 7 will be omitted from the following.

After step (3), two steps (13) and (14) are added, the step (13) being for carrying out a so-called "energy saving process", and the step (14) being for stopping of process of the flowcharts of FIGS. 12 and 13. Between steps (2) and (5), steps (15) and (16) are added, the step (15) being for judging whether each electric part has been energized or not, and the step (16) being for energizing the electric part when the same has not been energized. Furthermore, steps (17) and (18) are added. The step (17) is for judging, when step (9) judges No (that is, F=0), whether the pump switching process of FIG. 15 and the mode setting process of FIG. 16 are under operation or not. The process (18) is for operating such processes when step (17) has judged that the same are not under operation. Furthermore, in this second embodiment, at step (4), the control signal CS and the switching signal SL are determined to logical values "0".

The pump switching process shown in FIG. 12 is a timer-interruption process which is carried out at intervals of a given time $\Delta t$. That is, at step (20), a counter "c" is subjected to increment, and at step (21), a judgement is carried out as to whether or not the counted value of the counter "c" becomes an integer A which corresponds to the predetermined time T ($=\Delta t \times A$). When No at step (21), the operation flow goes to step (22) where a judgement as to whether a flag "a" is set to "1" or not is carried out. When No at step (22), that is, when the flat "a" is set to "0", the timer-interruption process is finished and the operation flow goes back to a predetermined main program.

As will become apparent hereinafter, the flag "a" means that, in the mode setting process of FIG. 13, the stroke is large enough and/or the existing condition is a condition achieved just after this larger stroke.

When step (21) judges that "c" is A, the operation flow goes to step (23) where the counter "c" is cleared to 0 (zero) and the operation flow goes to step (24).

At this step (24), the reference estimated fluid supply signal $Q_A$ from the adding means 76 (see FIG. 10) is read, and the operation flow goes to step (25) where the pump rotation speed representing signal N from the pump speed sensor 56 is read, and then the operation flow goes to step (26).

At this step (26), by referring to the map provided by FIG. 14, a reference mode of minimum discharge is set to which a coordinate point determined by only the value $Q_A$ and the value N belongs. That is, when the mode I is established, the seitching signal SL is set to "0" and when the mode II is established, the signal SL is set to "1".

Then, the operation flow goes to step (27) where a judgement as to whether the flag "a" is "1" or not is carried out again. When No, judging that the stroke is not large and/or the existing holding condition is not a holding condition achieved just after the large stroke, the operation flow goes to step (28). At this step (28), the reference mode determined at step (26) is finally set in this pump switching process. Then, at step (29), a switching signal SL representing the finally set mode is outputted to the drive circuit 80.

While, when Yes at step (27) (that is, flag "a" is "1"), the operation flow goes to step (30) where a mode higher than the reference mode by one mode is selected and then the operation flow goes to step (29). That is, if the reference mode set at step (26) is the mode "I", the mode "II" is selected, but if the reference mode is the mode "II", the mode "II" is kept unchanged.

When Yes at step (22) (that is, flag "a" is "1"), the operation flow goes through steps (30) and (29). Thus, a mode graded up by one mode from the newest reference mode is selected.

The mode setting process of FIG. 13 is also a timer-interruption process which is carried out at intervals of a given time $\Delta t$. That is, at step (31), the output $|X_L - \overline{X}_L|$ from the absolute value deriving circuit 90 is read, and then the operation flow goes to step (32) where the output $|XR - \overline{X}R|$ from the other absolute value deriving circuit 92 is read. Then the operation flow goes to step (33) where a judgement of $|X_L - \overline{X}_L| \geq E$ is carried out. It is to be noted that "E" is a predetermined value for determining that the stroke is large enough. When No at step (33), the operation flow goes to step (34) where a judgement of $|X_R - \overline{X}_R| > E$ is carried out. When No at step (34), judging that both the front left road wheel and front right road wheel are not under a larger stroke condition, the operation flow goes to step (35).

At this step (35), a judgement is carried out as to whether the flag "a" has been set to "1" in the previous process. When No, that is, when the flat "a" has been reset to "0", the timer-interruption process is finished and the operation flow is returned to a given main program. While, when Yes at step (35), the operation flow goes to step (36).

At this step (36), a judgement is carried out as to whether or not the counter "c" in the pump switching process of FIG. 12 has been cleared to "0". If No, judging that the front road wheels have escaped from such larger stroke condition but a predetermined time has not passed yet thereafter, the operation flow goes back to the given main program finishing the timer-interruption process. If Yes at step (36), the operation flow goes to step (37).

At this step (37), a counter "b" is subjected to increment, and then the operation flow goes to step (38) where a judgement is carried out as to whether or not the counted value of the counter "b" is "2". The judgement by step (37) is used for holding, after escaping from the larger stroke condition, an operating condition of an upper mode for at least a period of one cycle (viz., time T). When at step (38), b<2 is established, judging that a period consisting of the holding time $T_F$ and the time T has not passed yet, the operation flow goes back to a predetermined main program finishing the timer-interruption process. It is to be noted that an inequality of $0 \leq T_F < T$ is established and "$T_F$" is varied depending on the time when the front road wheels escape from such larger stroke condition. When at step (38) b=2 is established, judging that the period consisting of $T_F$ and T has passed, the operation flow goes to step (39) where the flag "a" is reset to "0" and then the operation flow goes back to the main program finishing the timer-interruption process.

While, when Yes at step (33) or (34), judging that both the front road wheels are under the larger stroke condition which causes a big change in posture of the vehicle and thus a larger fluid supply per unit time is needed for the active suspension system 6, the operation flow goes to step (40).

At this step (40), the flag "a" is set to "1" and then the operation flow goes to step (41) where the counter "b" is cleared to "0", and then the operation flow goes back to the main program finishing the timer-interruption process.

It is to be noted that the above-described holding time $T_F$ can be freely set depending on the frequency of the vehicle vibration, consumed horsepower of an associated engine and the like.

In this second embodiment, the lowpass filters 82 and 84, the adding means 86 and 88, the absolute value deriving circuits 90 and 92 and the processes shown by FIGS. 11 to 13 constitute the discharge control means 101b shown in the outlined view of FIG. 1.

In the following, operation of the entire of the active suspension system 6 will be described with reference to the drawings.

For ease of understanding, the description will be commenced with respect to a condition wherein the vehicle is at a standstill with the engine 36 kept OFF and the accessary switch associated with the ignition key cylinder is kept OFF.

When, due to a slight turning of the ignition key cylinder, the accessary switch is turned ON, the process of the flowchart of FIG. 11 is started. Under this, the engine is kept OFF, and thus, the rotation speed N sensed by the pump speed sensor 56 is zero. Thus, in the flowchart of FIG. 11, the operation flow goes, through step (2) where the judgement of $N > N_T$ is carried out, step (3) where the variable $f_{i-1}$ is set to "0", step (13) where the energy saving process is carried out in which only the electric parts actually needed for carrying out the active suspension operation are energized, and step (14) where the processes of the flowcharts of FIGS. 12 and 13 are stopped, to step (4) where the control signal CS and the switching signal SL are determined to logical values "0". Completing these steps, the timer-interruption process is finished.

As a result of this process, due to the energy saving operation at step (13), only the mode setting circuit 78 and the pump speed sensor 56 are energized leaving the stroke sensors 20FL and 20FR, the bandpass filters 66 and 68, the integrators 70 and 72, the lowpass filters 82 and 84 and the absolute value deriving circuits 90 and 92 deenergized. Thus, during the time for which the accessary switch is kept on, the electric power consumed for the electric circuit can be minimized.

When now the ignition key cylinder is turned to ON position through START position, the engine 36 starts to run. Upon this, the speed value N of the signal from the pump speed sensor 56 increases. When the value N exceeds a predetermined value $N_s$, the operation flow goes through step (15) to step (16). Thus, the electric parts which have been deenergized become energized.

Then, the operation flow goes to step (5). Thus, thereafter, similar to the case of the afore-mentioned first embodiment, the timer and the flag F are set, the control signal CS of logical value "0" is fed to the drive circuit 59 of the pump unit 34 to cause the same to assume the smaller discharge condition and the switching signal SL of logical value "0" is fed to the drive circuit 80 of the electromagnetic switching valve 43 to cause the same to assume the small flow position. Accordingly, the fluid discharged from the higher delivery pump 34A is forced to return to the tank 30 through the valve 43 permitting unloaded operation of the pump 34A, while, the fluid of smaller amount $Q_L$ discharged from the lower delivery pump 34B is fed to the pressure control valve 12 through the check valves 39C and 39B. With this, the pressure in the pressure control system under the pressure holding condition is gradually increased. This means that undesired rapid lifting of the vehicle is suppressed.

When, thereafter, the time-up is sensed by the timer, the control signal of logical value "138 is fed to the drive circuit 70 of the pump unit 34 (see step 11). With this, the respective discharges from the higher and lower delivery pumps 34A and 34B are changed to the normal values $Q_2$ and $Q_{1H}$. Because at step (11) the flag F is reset to "0", the subsequent timer-interruption process permits the operation flow to go from step (9) to step (17), so that the timer-interruption processes of FIGS. 12 and 13 start to run.

When the vehicle is under cruising on a straight smoothed road surface, the stroke change is minimized. Thus, under this condition, the operation flow in the process of FIG. 13 goes through steps (31), (32), (33) and (34) to step (35). Because the flag "a" has been reset to "0", the timer-interruption process is finished. Accordingly, when the process of FIG. 12 is carried out, by the steps (24) to (26), the coordinate point (for example, the point "m1" in the graph of FIG. 14) determined by the reference estimated fluid supply value $Q_A$ and the pump speed value N is read at intervals of the given time T to set a reference mode. Because the vehicle is running on the straight smoothed road surface, the stroke change is minimized and substantially no external force is applied to the vehicle body 2. Thus, the strokes $X_{FL}$ and $X_{FR}$ sensed by the stroke sensors 20FL and 20FR do not change, and thus the component of the outputs from the bandpass filters 66 and 68 is almost zero. Thus, the approximate expression of $Q_A \approx Q_O$ is established. Since, as is seen from the flowchart of FIG. 12, the reference estimated fluid supply value $Q_A$ is small and the flag "a" is "0", the reference mode determined at step (26) is finally set to the mode I at step (27). Thus, the switching signal SL becomes to have an OFF command causing the switching valve 43 to assume the small flow position. Thus, the variable delivery pump section 51 operates with the mode I. That is, the higher delivery pump 34A operates with no load and only the smaller discharge $Q_{1L}$ of the lower delivery pump 34B contributes to create the line pressure fed to the pressure control valve 12.

When then the vehicle comes to a gentle winding road, vertical vibrations of relatively low frequency (about 1 Hz) corresponding to the suspended resonance region are applied to the vehicle. Thus, at least one of the front road wheels 4 of the vehicle is subjected to a stroke vibration which is depicted by the graph of FIG. 15. (It is to be noted that in the graph the average $\overline{X}$ of the stroke is shown by a straight line for ease of explanation.) As is seen from this graph, near the time $t_1$, the stroke X is sharply increased from the neutral position (viz., average value $\overline{X}$), and within the period between the time $t_{11}$ and the time $t_{12}$, the stroke X exceeds the reference value E. Thereafter, the stroke X makes a similar action.

Since, until the time $t_{11}$, the inequalities of $|X_L - \overline{X}_L| < E$ and $|X_R - \overline{X}_R| < E$ are established, the condition of flag "a"="0" is maintained in the process of FIG. 13. Accordingly, the mode I set at the time $t_1$ by the process of FIG. 12 is continued to the time $t_{11}$. The lack of fluid in the supply line 38a, which may occur during this, is compensated by the work of the accumulator 52.

Since, within the period from the time $t_{11}$ to the time $t_{12}$, at least one of the inequalities of $|X_L - \overline{X}_L| \geq E$ and $|X_R - \overline{X}_R| \geq E$ is established, the process of FIG. 13 causes the flag "a" to become "1". Accordingly, in the process of FIG. 12, due to the works of steps (20), (21), (22), (30) and (29), the operation mode II is enforcedly set, which is graded up by one mode from the latest reference mode I. If a larger stroke occurs at the time $t_1$, that is, when $t_{11}=t_1$ is established, the steps (27), (30) and (29) of the process of FIG. 12 cause the mode up of the operation mode.

Accordingly, the switching valve 43 is turned to assume the large flow position. Under this, the lower delivery pump 34B is operated with no load and the larger discharge $Q_2$ from the the higher delivery pump 34A is outputted.

That is, in this second embodiment, at the time $t_{11}$ just after the time when the vertical vibration is applied to the vehicle, the mode-up command, (viz., the command for increasing the line pressure), is issued. This means a quick responsibility in the pressure increasing timing as compared with a conventional system in which the pressure increasing timing is determined in accordance with the normal acceleration of the vehicle.

After the time $t_{12}$, the inequalities of $|X_L - \overline{X}_L| < E$ and $|X_R - \overline{X}_R| < E$ become established again. During the period from $t_{12}$ to $t_3$ for which the mode-up condition is maintained, a contraction stroke occurs, and within a period from the time $t_{13}$ to the time $t_{21}$, the stroke X exceeds the reference value $-E$. Accordingly, during the period from the time $t_{13}$ to the time $t_{21}$, by the operation of step (41) of the process of FIG. 13, the counter "b" becomes cleared causing updating of the holding period. Thus, during this, measuring of $(T_F + T)$ is started again. During this measuring, the graded-up operation mode II is maintained. This fluid increasing control is repeated so long as the larger stroke condition is continued.

In addition to the above-mentioned mode up control, the active suspension system 6 carries out a vehicle posture control against the vibration applied to the vehicle. That is, at the time when the vehicle runs into a leading part of the winding road, the pressure in the pressure chamber L of the hydraulic cylinder 10 (see FIG. 9) is increased or lowered. In response to this pressure change, the spool 15 (see FIG. 3) of the pressure control valve 12 moves but slightly as has been mentioned hereinafore, so that the fluid is forced to flow through the valve 12 between the hydraulic cylinder 10 and the fluid supply device 8 for damping the vibration.

When, due to advancing of the vehicle into a middle part of the winding road, the vibration can not be damped anymore by the movement of the spool 15, the vehicle body tends to vibrate vertically. However, upon this, the normal acceleration sensor 19C outputs a corresponding acceleration signal $Z_G$ to the posture control circuit 18. Based on this signal $Z_G$, the circuit 18 calculates the command value I for damping the vertical vibration and inputs the signal of the command value I to the pressure control valve 12 of each road wheel. Thus, within the hydraulic cylinder 10, there is generated a force proportioned to the absolute velocity in the vertical direction, and thus, the vertical vibration of the vehicle is assuredly damped.

Under this vibration control condition, the amount of fluid used is much greater than that used under cruising on a straight road. In this embodiment, at the time $t_{11}$ when the larger stroke starts, the operation mode is switched to the operation mode II to increase the fluid used in the system. That is, a sufficient amount of fluid is prepared prior to the time when the fluid is used. That is, in this embodiment, the undesired delay of fluid increasing, which tends to occur in the conventional active suspension system, does not occur. Furthermore, even when the vehicle is subjected to a larger stroke condition during the time when a regular mode is to be set, the fluid increasing can be in time. Thus, even when the vehicle is under cruising on a winding road, the passengers in the vehicle are given a good ride.

When the vehicle runs out of the winding road and into another straight road with smoothed surface at the time $t_{N1}$ (see FIG. 15), the stroke vibration is gradually reduced thereafter. However, since the above-mentioned operation mode II is maintained until the time $t_{N+2}$ which consists of $T_{N1}$ and $(T_F+T)$, the larger amount of fluid is fed to the system to keep the line pressure even when a relatively larger stroke vibration is applied to the vehicle just after the escape from the larger stroke condition. The feeding of the larger amount of fluid to the system induces a quick accumulation of pressure in the accumulator 52. When the time passes the time $t_{N+2}$, the process of FIG. 13 causes the flage "a" to take "0", and thus, the process of FIG. 12 causes the operation mode to take the reference mode. That is, when the stroke vibration is small, the operation mode is returned to the mode I wherein the smaller discharge is provided by the pump unit 34. With this, the energy saving is promoted.

If, during the above-mentioned control, the winding road is short in length, that is, when the larger stroke does not occur even after the time $t_{21}$, the mode II having been set at the time $t_{11}$ is maintained for a given time from the time $t_{21}$. This can deal with the swing back action of the running vehicle.

When the vehicle stops thereby causing the estimated fluid supply to become small, the operation mode I is established and thus the consumed horsepower of the associated engine can be reduced. When the ignition key cylinder is turned to OFF position to stop the engine, the discharge from the power unit 34 becomes zero instantly. Thus, thereafter, the fluid in the system leaks gradually to the drain side through the pressure control valve 12. When the pilot pressure $P_P$ becomes equal to the value $P_N$, the check valve 41 is turned to assume a closed position. Thus, thereafter, the fluid pressure in the hydraulic cylinder 10 is kept at the value $P_N$ and thus a flat posture of the vehicle is obtained.

As will be understood from the above description, the second embodiment has the following advantages.

That is, in the second embodiment, by using a stroke signal which can precisely represent the condition of a road surface, an estimated fluid supply is calculated every given time T, and by using the estimated fluid supply, a pump operation mode is determined, and based on this mode, the variable delivery pump unit 34 is controlled. Thus, effective fluid supply is obtained in the active suspension system 6, and the consumed horsepower of the associated engine can be reduced. In particular, since the fluid increase is instantly made in the case of controlling the vertical vibration which needs a larger fluid supply, the responsibility of the system is much improved. Furthermore, even when the time T is set relatively long, the undesired response delay does not occur.

In the following, modifications of the present invention will be described.

In the second embodiment, two operation modes I and II are provided. However, if desired, in addition to these two operation modes I and II, a third operation mode III wherein much greater fluid supply is obtained may be added. This third operation mode can by provided by feeding the pressure control valve 12 with both the discharge from the higher delivery pump 34A and the lower delivery pump 34B. In this modification, much delicate fluid discharge control is obtained.

In the second embodiment, it is described that, upon occurrence of the larger stroke, the fluid supply to the active suspension system 6 is increased by carrying out the mode-up operation. However, if desired, the setting of the operation mode may be based on a value which is provided by adding the reference estimated fluid supply value $Q_A$ and a predetermined value $\beta_o$.

In the second embodiment, it is described that the fluid supply increase is carried out in accordance with the stroke representing signals $X_{FL}$ and $X_{FR}$ from the stroke sensors 20FL and 20FR. However, if desired, the correction may be carried out in accordance with the acceleration representing signal $Y_G$ from the lateral acceleration sensor 19A. That is, based on the signal $Y_G$, a judgement as to whether the vehicle is under larger rolling condition or not is carried out, and upon judgement of the larger rolling condition, the fluid supply increase is carried out.

In the second embodiment, the reference estimated fluid supply value $Q_A$ is used for setting the reference mode. If desired, a fixed value determined on a smoothly surfaced straight road may be used as a substitute for the value $Q_A$. In this modification, the system can be simplified in construction.

As the pumps 34, 34A and 34B, various types of variable delivery pumps may be used.

In the above-mentioned two embodiments, it is described that the judgement as to whether the pump (or pump unit) 34 is under a starting condition or not is carried out based on the rotation speed N sensed by the pump speed sensor 56. If desired, such judgement may be made by sensing whether the ignition switch is ON or OFF.

In the above-mentioned two embodiments, it is described that the open condition of the pilot control type check valve 41 is estimated by a timer. However, if desired, such estimation may be made by comparing the pressure between the check valve 39 (or 39B) and the pressure control valve 12 with the set pressure of the pilot control type check valve 41.

What is claimed is:

1. An active suspension system for use in a motor vehicle having a vehicle body and road wheels, said system comprising:

a hydraulic cylinder operatively interposed between said vehicle body and each of said road wheels;

a fluid supply device for feeding said hydraulic cylinder with an working fluid, said fluid supply device having larger and smaller discharge modes;

a fluid supply line extending from said fluid supply device to said hydraulic cylinder for carrying the working fluid to said hydraulic cylinder;

a pressure control valve operatively disposed in said fluid supply line for controlling the flow of the working fluid in the fluid supply line;

a fluid return line extending from said pressure control valve to said fluid supply device for returning the working fluid to said fluid supply device;

a pressure holding system for holding the hydraulic pressure in said hydraulic cylinder, said pressure holding system including a first check valve operatively disposed in said fluid supply line and a second check valve operatively disposed in said fluid return line, said second check valve being of a pilot pressure control type wherein the pressure in said fluid supply line downstream of said first check valve is used as a pilot pressure;

a vehicle posture control means for actively controlling the posture of the vehicle by operating said pressure control valve; and a control unit for controlling said fluid supply device in such a manner that, upon starting of said fluid supply device, said fluid supply device assumes said smaller discharge mode until said second check valve becomes to open and that, upon opening of said second check valve, said fluid supply device becomes to assume said larger discharge mode.

2. An active suspension system as claimed in claim 1, in which said fluid supply device comprises a variable delivery pump means driven by an engine mounted in the motor vehicle.

3. An active suspension system as claimed in claim 1, further comprising:

an accumulator connected to said fluid supply line between said first check valve and said pressure control valve; and a relief valve interposed between said fluid supply line and said fluid return line for setting the pressure in said fluid supply line at a predetermined value.

4. An active suspension system as claimed in claim 2, in which said control unit comprises:

a pump speed sensor for sensing the operation speed of said pump means and issues a signal representative of the operation speed of the pump means; and a discharge control circuit for controlling said pump means in accordance with the speed representing signal issued from said pump speed sensor.

5. An active suspension system as claimed in claim 4, in which said discharge control circuit comprises:

first means for detecting a start time at which said pump means starts to operate by treating the speed representing signal issued from said pump speed sensor;

second means for causing said pump means to assume said smaller discharge mode upon detection of said start time by said first means;

third means for keeping said smaller discharge mode for a predetermined period within which said second check valve becomes to open; and fourth means for causing said pump means to assume said larger discharge mode upon expiration of said predetermined period.

6. An active suspension system as claimed in claim 5, in which said vehicle posture control means comprises:

first sensor means for issuing a signal representative of a lateral acceleration of the vehicle;

second sensor means for issuing a signal representative of a longitudinal acceleration of the vehicle;

third sensor means for issuing a signal representative of a normal acceleration of the vehicle;

fourth sensor means for issuing a signal representative of a distance between the vehicle body and a front left road wheel;

fifth sensor means for issuing a signal representative of a distance between the vehicle body and a front right road wheel;

sixth sensor means for issuing a signal representative of a distance between the vehicle body and a rear left road wheel;

seventh sensor means for issuing a signal representative of a distance between the vehicle body and a rear right road wheel; and a posture control circuit for controlling said pressure control valve by treating the signals from said first, second, third, fourth, fifth, sixth and seventh sensor means.

7. An active suspension system as claimed in claim 6, in which the signals from said fourth and fifth sensor means are applied to said discharge control circuit for controlling said said pump means in such a manner that when the vehicle is under cruising on a winding road, said pump means assumes said larger discharge mode, and when the vehicle is under cruising on a straight smoothed surface road or at a standstill, said pump means assumes said smaller discharge mode.

8. An active suspension system as claimed in claim 7, in which said pump means comprises:

a larger discharge variable delivery pump which is operated when said larger discharge mode is assumed; and a smaller discharge variable delivery pump which is operated when said smaller discharge mode is assumed.

9. An active suspension system as claimed in claim 8, in which said smaller discharge delivery pump effects a much smaller discharge when the engine starts to operate.

10. An active suspension system as claimed in claim 9, further comprising an electromagnetic switching valve of spring offset type, said valve having first and second operative positions, said first operative position being a position wherein the discharge from said larger discharge variable delivery pump is drained to a drain tank therethrough, and said second operative position being a position wherein the discharge from said smaller discharge variable delivery pump is drained to said drain tank therethrough.

11. An active suspension system as claimed in claim 10, in which said discharge control circuit comprises:

bandpass filters which respectively filter the signals from said fourth and fifth sensor means;

integrators which integrate the filtered signals from said bandpass filters respectively;

a pilot discharge setter which issues a signal for setting the pilot pressure of said second check valve;

adding means which adds the integrated signals the integrators and the signal from the pilot discharge setter;

a mode setting circuit which, by treating a signal from the adding means and the signal from said pump speed sensor, sets the delivery mode of the pump means; and a drive circuit which, by treating a signal from the mode setting circuit, issues a switching signal which is fed to said switching valve.

12. An active suspension system as claimed in claim 11, in which said discharge control circuit further comprises:

lowpass filters which derive average values of the signals from said fourth and fifth sensor means;

adding means which derive differences between the average values of the signals and the signals from said fourth and fifth sensor means; and absolute value deriving circuits which derive the absolute values of said differences and feed signals representative of said absolute values to said mode setting circuit.

* * * * *